United States Patent [19]

Usui et al.

[11] Patent Number: 4,561,484

[45] Date of Patent: Dec. 31, 1985

[54] METHOD OF TREATING A CAST IRON MEMBER PRIOR TO JOINING TO ANOTHER MEMBER

[75] Inventors: Masayoshi Usui, Numazu; Osamu Yonemochi, Nagoya, both of Japan

[73] Assignee: Usui Kokusai Sangyo Kabushiki Kaiska, Shizuoka, Japan

[21] Appl. No.: 554,126

[22] Filed: Nov. 21, 1983

[30] Foreign Application Priority Data

Apr. 8, 1983 [JP] Japan .................................. 58-61661

[51] Int. Cl.⁴ .............................................. B22D 19/00
[52] U.S. Cl. ..................................... 164/101; 228/206
[58] Field of Search ............................... 164/101, 102; 228/263.14, 263.15, 206, 207

[56] References Cited

U.S. PATENT DOCUMENTS

| | | | |
|---|---|---|---|
| 2,311,623 | 2/1943 | Blackmun et al. | 228/206 |
| 2,634,469 | 4/1953 | Pershing et al. | 164/102 |
| 2,871,886 | 2/1959 | Obrebski et al. | 228/206 |
| 3,687,738 | 8/1972 | Malkin et al. | 228/206 |

*Primary Examiner*—Nicholas P. Godici
*Attorney, Agent, or Firm*—Anthony J. Casella; Gerald E. Hespos

[57] ABSTRACT

A method of welding, soldering or fusing a cast iron member to another member of cast iron or other metal, wherein the cast iron member is dipped in a hot concentrated aqueous solution of chromic acid, and washed with water before it is joined to the other member.

4 Claims, 3 Drawing Figures

METHOD OF TREATING A CAST IRON MEMBER PRIOR TO JOINING TO ANOTHER MEMBER

BACKGROUND OF THE INVENTION

1. Field of the Invention:

This invention relates to a method of joining a cast iron member to another member of cast iron or other metal.

2. Description of the Prior Arts:

Cast iron is widely used in various fields of industry, and particularly, for industrial machines and internal combustion engines, since it is inexpensive, and has excellent mouldability and vibration damping properties. There are, however, considerable limitations to the use of cast iron in fabricated structures since it is not easy to join two cast iron members or a cast iron member and a member of other metal by brazing, welding or fusing.

For example, the top of a cast aluminium alloy piston for a diesel engine is required to be heat and wear resistant in order to resist an increased thermal load. It has, therefore, been proposed to join cast iron or a ceramic material to the top of the piston by fusing, caulking or bolting or otherwise. The combination of such different materials is, however, still far from satisfactory from the standpoint of reliability and economy. For example, the piston is liable to crack as a result of rapid heating for casting or insufficient fusion, or to be damaged by vibration upon exposure to a high temperature during the operation of the engine.

SUMMARY OF THE INVENTION

One object of this invention is to utilize the excellent mouldability, vibration damping property, economy, and heat and wear resistance of cast iron, and enable an effective joint to be made between a cast iron member and another member, or cast iron, aluminium alloy or other metal or alloy.

In accordance with the invention we propose dipping the cast iron member in a hot aqueous solution of chromic acid, and washing it preferably with water, before it is joined by welding, brazing or fusing to another cast iron member or an aluminium alloy or other metal member. Such preliminary treatment achieves complete decarbonisation of the cast iron member.

The invention enables the treatment of cast iron members having a complicated shape, such as a cylinder head, the cylinder or piston of an internal combustion engine, to improve their gas tightness and adaptability to other members. The use of such a cast iron member improves the heat and wear resistance of a component part which has hitherto been made solely of an aluminium alloy or other metal.

BRIEF DESCRIPTION OF THE DRAWINGS

Embodiments of the invention will now be described in more detail with reference to examples and to the accompanying drawings, of which.

DETAILED DESCRIPTION OF THE INVENTION

The method of this invention is applicable to various kinds of cast iron, such as ordinary cast iron, high tensile cast iron, malleable cast iron and a cast ferroalloy. More specifically, it is applicable to, for example, grey cast iron, ductile cast iron, and a ferronickel or ferrochromium-molybdenum castings. The method is applied to any such cast iron before it is joined to, for example, an iron casting, or a casting of steel such as carbon or nickel-chromium steel, a copper alloy such as brass, or an aluminium alloy such as Y metal or Lo-Ex. Although the structure of cast iron depends on the alloying elements which it contains and the history of its heat treatment, it usually contains ferrite, pearlite, martensite or troostite formed by the transformation of iron, cementite ($Fe_3C$) and graphite. Graphite gives rise to difficulties in the soldering or welding of cast iron, since it is not wetted by a molten metal, produces $CO_2$ gas and undergoes a change in structure upon exposure to a high temperature.

Dipping of the cast iron member in a concentrated aqueous solution of chromic acid causes the graphite on the surface of the member or otherwise exposed therefrom to react with the chromic acid, and thereby to be removed therefrom. This reaction proceeds very slowly at ambient temperature, and therefore it is best to use a hot solution of chromic acid preferably at a temperature of 70° C. to 100° C. Although the length of time for which the cast iron member needs to remain immersed in the solution depends on its size, from say, five to 30 minutes is usually sufficient. The concentration of the chromic acid solution may be such that it has a specific gravity of 1.3 to 1.6. The treatment enables the complete removal of graphite from the surface of the cast iron member although subsequent careful washing preferably with water is desirable since the surface of the cast iron member has pinholes. Also, it is preferable to wash the surface of the cast iron member with a 5 to 10% NaOH solution before treating it with chromic acid.

As no carbonaceous substance remain on the surface of the cast iron member, it can easily be joined to another member of cast iron or other metal by conventional metal soldering or welding techniques. The cast iron member can be joined to an aluminium alloy not only by soldering or welding, but by casting as well. A molten aluminium alloy can be cast on the decarbonized surface of the cast iron member by any customary method. As cast iron has a relatively low thermal conductivity, however, it is preferable to preheat the cast iron member to a temperature of 250° C. to 350° C. in order to prevent the formation of fine cracks, though such preheating may not be required if the member is small.

Figure 1:
FIG. 1 is a micrograph showing the surface of untreated ductile cast iron.
Figure 2:
FIG. 2 is a micrograph showing the surface of a ductile cast iron treated with a solution of $H_2CrO_4$ in accordance with this invention.
Figure 3:
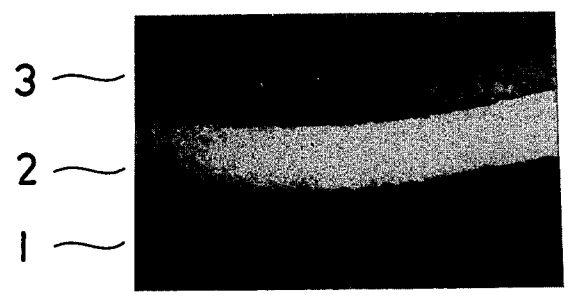
FIG. 3 is a micrograph showing a cross section of a product obtained by joining to carbon steel the ductile cast iron treated by the method of this invention.

Ductile cast iron contains graphite on its surface as indicated by the black specks in the microphotograph of 500 magnifications of FIG. 1. If ductile cast iron is treated with $H_2CrO_4$, graphite is removed, and voids are formed as the centres of the specks look white in FIG. 2. FIG. 3 which is a microphotograph of the cross section of a product obtained by joining such ductile cast iron to carbon steel, shows ductile cast iron 1 firmly joined to carbon steel 3 by a brass solder layer 2. If the cast iron surface is not treated with $H_2CrO_4$, streaks are formed by a layer or air between the cast iron and the solder.

EXAMPLE 1

Two pieces of grey cast iron (of the type designated as FC25 by Japanese Industrial Standard) each having a length of 30 mm, a width of 20 mm and a thickness of 8 mm were degreased by washing with a 10% aqueous solution of NaOH, and washed with a 6N aqueous solution of HCl in order to dissolve oxides on the cast iron surfaces. The two pieces were then dipped in a hot aqueous solution of chromic acid ($H_2CrO_4$) having a specific gravity of 1.37, and held at about 85° C. for six minutes. They were finally washed carefully with warm water and dried.

Following pretreatment, the cast iron pieces were supported with surfaces thereof measuring 20 mm by 8 mm in abutment to form a V-shaped joint, and welded together by cold arc welding using a mild steel electrode. During subsequent tensile testing of the welded assembly the cast iron pieces were broken, and the joint was found to have an adhesive strength of at least 27.7 kg/mm$^2$.

EXAMPLE 2

A piece of ductile cast iron measuring 30 mm square by 7 mm in thickness was washed with a 10% aqueous solution of NaOH, and then the oxides and other contaminants on the cast iron surface were removed by washing with a 6N aqueous solution of HCl. It was, next dipped in a hot aqueous solution of chromic acid having a specific gravity of 1.37, heated at about 70° C. for about eight minutes, washed carefully with warm water, and dried.

A cast piece of a commercially available aluminium alloy Lo-Ex (of the type designated as AC 8A by Japanese Industrial Standard) measuring 30 mm square by 10 mm in thickness was washed with a 10% aqueous solution of NaOH, dipped in a mixed solution containing 10% of $HNO_3$ and 0.2% of HF for about four minutes to remove silicon oxide, washed carefully with warm water and dried.

A soldering material (Al-10% Si, 4% Cu) equivalent to BAL-O (Alcoa No. 719) was disposed between the 30 mm square surfaces of the two pieces following pretreatment as described above, and the assembly was placed in an electric furnace at a temperature of 500° C. The furnace temperature was raised to 560° C., and the assembly was held at that temperature for about 10 minutes, with the result that the cast iron member was joined to the cast aluminium alloy member.

The soldered assembly was subjected to a tensile test during which the aluminium alloy portion was broken, and the joint was found to have a tensile strength of at least 24.5 kg/mm$^2$.

We claim:

1. A method of joining a cast iron member to another member of cast iron or other metal by welding, soldering or fusing, said cast iron member including at least one surface and further including $Fe_3C$ or graphite disposed adjacent said surface, said method comprising the steps of: dipping the cast iron member in a concentrated aqueous solution of chromic acid for between approximately five minutes and thirty minutes, said solution of chromic acid having a specific gravity of between approximately 1.3 and 1.6 and having a temperature of between approximately 70° C. and 100° C. to remove substantially all of the $Fe_3C$ and graphite from said surface; washing the cast iron member to remove any remaining $Fe_3C$ and graphite from said surface; and joining the surface of the cast iron member to the other member, whereby the removal of the $Fe_3C$ and graphite from the surface of the cast iron member enables said cast iron member to be efficiently and securely joined to the other member.

2. A method according to claim 1 further including washing the cast iron member with a 5 to 10% aqueous solution of NaOH before dipping.

3. A method according to claim 1, wherein the other member comprises an aluminium alloy which is cast on the cast iron member after the dipping and washing.

4. A method according to claim 3, further including heating the cast iron member to a temperature of 250° C. to 350° C. before the molten alloy is cast.

* * * * *